Patented Mar. 7, 1944

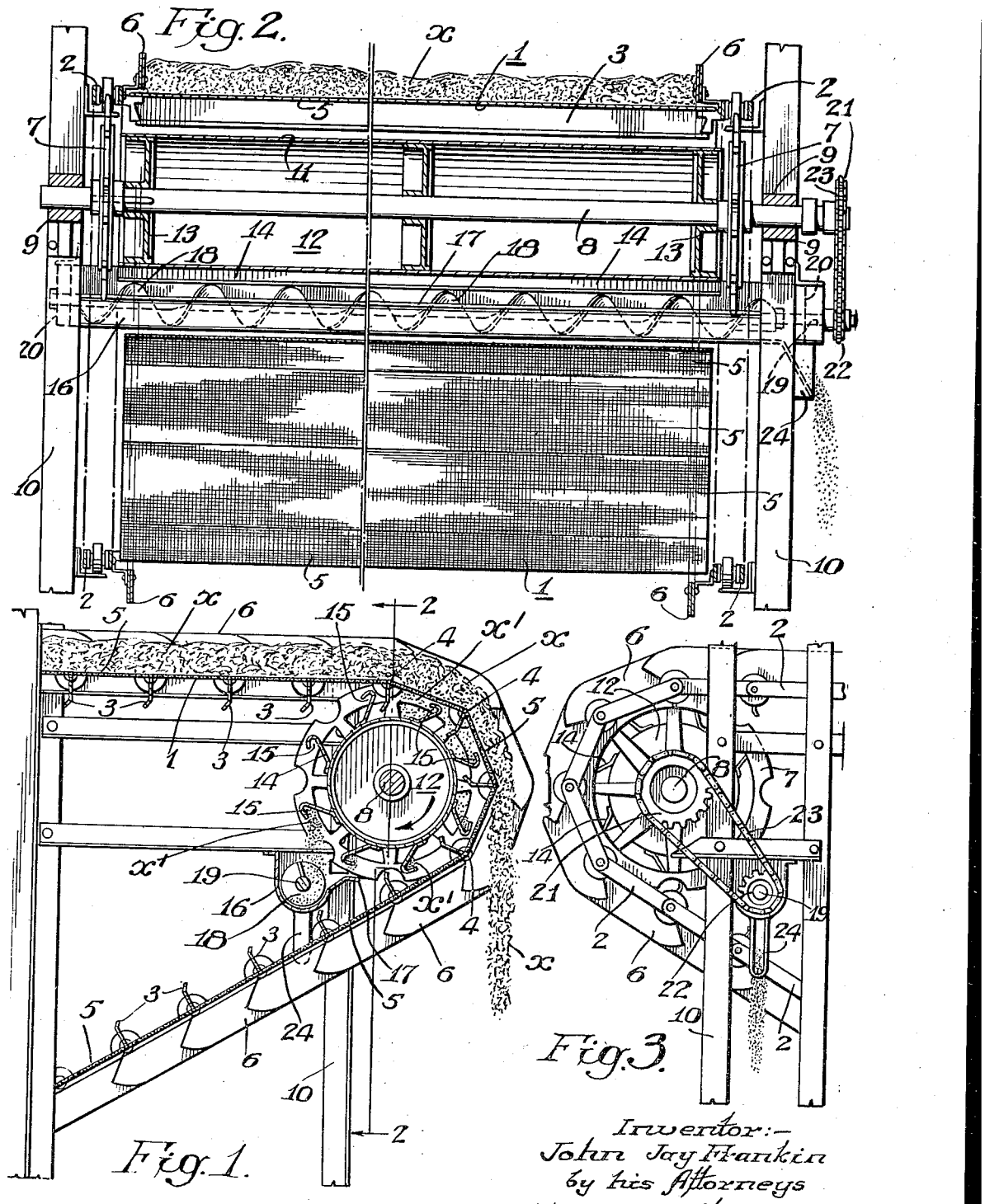

2,343,762

UNITED STATES PATENT OFFICE 2,343,762

SIFTINGS COLLECTOR FOR ENDLESS BELT CONVEYERS

John Jay Franklin, Glenside, Pa., assignor to Proctor & Schwartz, Incorporated, Philadelphia, Pa., a corporation of Pennsylvania Application July 6, 1942, Serial No. 449,923

10 Claims. (Cl. 198—229)

This invention relates to endless belt conveyers and particularly to those of a foraminous nature, wherein the conveyer floor is composed of wire mesh screen, perforated sheets, spaced bars, etc.

The present invention is directed to foraminous conveyers employed in the transportation of lump, granular, fibrous, or any other materials which may contain or which may be subject to the formation of fines by attrition in transit, i. e., small particles which can sift through the foraminous floor of the conveyer.

It has been observed that the greatest amount of sifting occurs at the discharge end of the conveyer, where the material slides on and relative to the foraminous supporting surface of the conveyer floor as the latter turns downwardly from the plane of the carrying run of the conveyer in returning to the loading station along the path traversed by the conveyer.

Conveyers of the type noted usually include laterally spaced side chains and transversely extending girts to which the foraminous flooring of the conveyer is attached. The side chains pass around sprockets at the ends of the conveyer right where the direction of movement of the conveyer changes.

The fines sifting through the floor of the conveyer collect on the sprockets, shafting, bearings, etc., at the discharge end of the conveyer and are frequently carried back into the dryer or other apparatus with which the conveyer is associated. This causes a fouling of the mechanical parts and results in a loss of the sifted material, which many times is of a usable character.

The object of the present invention is to provide means for collecting siftings at the places where the course of a foraminous conveyer changes, or at places where a shifting of the load, relative to the foraminous surface on which the load normally reposes, occurs.

Another object of the invention is to transport the collected fines to one or both sides of the conveyer for return to the bulk of material discharged from the conveyer or for transportation to any other desired place adjacent or remote to the conveyer.

In the accompanying drawing:

Fig. 1 is a longitudinal sectional elevation of the discharge end of a foraminous conveyer, showing the siftings collector of the present invention applied thereto;

Fig. 2 is a transverse sectional elevation taken on the line 2—2, Fig. 1; and

Fig. 3 is a side elevation illustrating the discharge of the collected fines at one side of the conveyer.

The floor of a conventional foraminous conveyer, illustrated at 1, is supported by and between laterally spaced side chains 2, 2 with transversely extending girts 3, 3, also carried by said side chains, underlying the floor 1 at the joints 4 between the pivotally connected sections 5, 5 of the conveyer floor.

The side chains 2, 2 also support upstanding side guards 6, 6 along the opposite marginal side edges of the sections 5, 5 of the conveyer, with the ends of the successive side guards in longitudinally overlapping relation to each other, whereby the material $x$ supported by the carrying run of the conveyer is prevented from falling off the side edges of the conveyer in transit.

The side chains 2, 2 pass around sprockets 7, 7 and change the direction of the conveyer, as shown in Figs. 2 and 3. The sprockets 7, 7 are secured to a shaft 8 which is rotatably mounted, adjacent its opposite ends respectively, in bearings 9, 9, secured to any suitable supporting structure 10, such as the framework of a dryer, through which the conveyer transports the material $x$.

As the direction of movement of the conveyer flooring 1 changes, at the discharge end of the conveyer as shown in Fig. 1, the material $x$ slides along the increasingly tilting sections 5, 5 of the foraminous flooring 1, as it is dumped off the conveyer. This causes any fines which may have been mixed with or formed by attrition in the bulk of the material $x$ on the floor 1, to sift through the interstices of the wire mesh, perforations, or slots, etc., of the foraminous flooring 1, as indicated at $x^1$.

In accordance with the present invention the fines $x^1$, as they sift through the flooring 1, drop onto the peripheral surface 11 of a drum 12 which is concentrically disposed around the shaft 8 intermediate the sprockets 7, 7.

The drum 12 is of hollow construction and includes heads 13, 13 which are secured to the shaft 8, to effect turning of the drum with the sprockets 7, 7.

Projecting from the peripheral surface 11 of the drum 12, substantially tangentially thereto, is a series of transversely extending blades 14, 14, the outer edges of which are turned backwardly with respect to the direction of rotation of the drum to form a series of buckets 15, 15 on the drum.

The fines $x^1$ sifting through the tilting sections 5, 5 of the floor 1, as the shaft 8 rotates in the direction of the arrow, Fig. 1, slide around the face 11 of the drum 12 and down the blades 14, 14 into the buckets 15, 15.

As the buckets 15, 15 pass under the bottom of the drum 12 from one side thereof, and start to move upwardly again at the opposite side of the drum the sifted fines, which collected in the buckets 15, 15, are dumped thereby into a transversely extending trough 16, which is carried by the framework 10 parallel to the shaft 8.

The trough 16 is provided with a forwardly projecting lip 17 which extends under the drum 12 and catches any of the fines which may fall from any of the buckets 15 prior to the buckets reaching their full dumping positions over the body of the trough 16.

The sifted fines dumped into the trough 16 by the buckets 15, 15 are conveyed along the trough 16 to one side of the foraminous conveyer, by a helical conveyer 18.

The helical conveyer 18 includes a central shaft 19 which is rotatably mounted in bearings formed in or carried by the end closures 20, 20 of the trough 16.

One end of the shaft 8 and a corresponding end of the shaft 19 project beyond the framework 10 and are fitted with sprockets 21 and 22 respectively, which are operatively connected by a chain belt 23 to turn the helical conveyer 18 in predetermined relation to the rotation of the shaft 8.

The helical conveyer 18 discharges the collected fines from one end of the trough 16 through a spout 24 which projects from one end wall 20 of the trough.

From the spout 24 the recovered fines may be delivered into any suitable receptacle to be again mixed with the bulk of the material discharged from the conveyer 1, or the fines may be conducted to any suitable place remote to the conveyer, without departing from the spirit of the present invention.

The angular spacing of the blades 14, 14 and the buckets 15, 15 at the outer ends thereof provide suitable clearance recesses for and into which the girts 3, 3 pass as the sprockets 7, 7, and the drum 12 rotate in unison about the axis of the shaft 8.

The entering of the blades 14 and buckets 15 into the spaces between the girts 3, and vice versa, permits the buckets to assume positions immediately adjacent the undersides of the respective sections 5 of the floor of the conveyer 1, as the conveyer turns about the axis of the shaft 8 on which the supporting drum 12 for the buckets rotates, whereby the buckets will catch the fines sifting through the foraminous conveyer sections and prevent such siftings from falling onto the rear faces of the girts respectively advancing ahead of the buckets.

I claim:

1. The combination of a foraminous conveyer, means for guiding said conveyer in an arcuate path from a normal plane of travel, a rotary drum operating within the arc of deviation of said conveyer, and a series of buckets on the periphery of said drum for collecting material sifting through the conveyer in the locality of said deviation.

2. The combination of a foraminous conveyer, means for guiding said conveyer in an arcuate path from a normal plane of travel, a rotary drum operating within the arc of said path, a series of buckets carried by said drum for collecting material sifting through the conveyer in the vicinity of deviation of the conveyer, and means extending transversely of the conveyer beneath said drum for receiving the sifted material from said buckets.

3. The combination of a foraminous conveyer, means for guiding said conveyer in an arcuate path from a normal plane of travel, a rotary drum operating within the arc of said path, a series of buckets carried by said drum for collecting material sifting through the conveyer in the vicinity of deviation of the conveyer, and a trough extending transversely of the conveyer beneath said drum for receiving the sifted material from said buckets.

4. The combination of a foraminous conveyer, means for guiding said conveyer in an arcuate path from a normal plane of travel, a rotary drum operating within the arc of said path, a series of buckets carried by said drum for collecting material sifting through the conveyer in the vicinity of deviation of the conveyer, a trough extending transversely of the conveyer beneath said drum for receiving the sifted material from said buckets, and means operating lengthwise of said trough for discharging the sifted material therefrom at one side of the conveyer.

5. The combination of a foraminous conveyer, means for guiding said conveyer in an arcuate path from a normal plane of travel, a rotary drum operating within the arc of said path, a series of buckets carried by said drum for collecting material sifting through the conveyer in the vicinity of deviation of the conveyer, a trough extending transversely of the conveyer beneath said drum for receiving the sifted material from said buckets, and a helical conveyer operating within said trough to force the sifted material therefrom to one side of said foraminous conveyer.

6. The combination of a foraminous conveyer, laterally spaced side chains forming part of said conveyer, sprockets about which said chains pass to deflect the conveyer from a normal plane of travel for dumping transported material from the conveyer, a shaft on which said sprockets are secured, a drum secured to said shaft intermediate said sprockets, and a series of buckets on the periphery of said drum for collecting material sifting through the conveyer as it passes around the axis of said shaft.

7. The combination of a foraminous conveyer, laterally spaced side chains forming part of said conveyer, sprockets about which said chains pass to deflect the conveyer from a normal plane of travel for dumping transported material from the conveyer, a shaft on which said sprockets are secured, a drum secured to said shaft intermediate said sprockets, a series of buckets on the periphery of said drum for collecting material sifting through the conveyer as it passes around the axis of said shaft, a trough extending transversely of and beneath said conveyer for receiving the sifted material from said buckets, and means for conveying the sifted material lengthwise of said trough to one side of the conveyer.

8. The combination of a foraminous conveyer, laterally spaced side chains forming part of said conveyer, sprockets about which said chains pass to deflect the conveyer from a normal plane of travel for dumping transported material from the conveyer, a shaft on which said sprockets are secured, a drum secured to said shaft intermediate said sprockets, a series of buckets on the periphery of said drum for collecting material sifting through the conveyer as it passes around the axis of said shaft, a trough extending transversely of and beneath said conveyer to receive the sifted material from said buckets, a helical conveyer for moving said sifted material along and out of one end of the trough, and means operatively connecting said helical conveyer to said shaft for simultaneous rotation.

9. The combination with a conveyer including a foraminous flooring and transversely extending girts beneath said flooring at spaced intervals along the length of the conveyer, means rotatable about a predetermined axis for deflecting the conveyer in an arc of predetermined radius from a normal plane of travel, and means rotatable about said axis in the arc of deflection of said conveyer and including means projecting into the spaces between the successive girts to positions adjacent the conveyer flooring for catching fines sifting through said flooring and preventing said siftings from falling onto said girts.

10. The combination with a conveyer including a foraminous flooring and transversely extending girts beneath said flooring at spaced intervals along the length of the conveyer, means rotatable about a predetermined axis for deflecting the conveyer in an arc of predetermined radius from a normal plane of travel, a drum rotatable about said axis in the arc of deflection of said conveyer and a series of buckets projecting from the periphery of said drum into the spaces between the successive girts to positions adjacent the conveyer flooring for catching fines sifting through said flooring and preventing said siftings from falling onto said girts.

JOHN JAY FRANKLIN.